(12) United States Patent
Hong (10) Patent No.: US 9,075,240 B2
(45) Date of Patent: Jul. 7, 2015

(54) THREE-DIMENSIONAL IMAGE DISPLAY DEVICE AND METHOD OF DRIVING THE SAME

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1629 days.

(21) Appl. No.: 12/292,981

(22) Filed: Dec. 2, 2008

(65) Prior Publication Data

US 2009/0141122 A1 Jun. 4, 2009

(30) Foreign Application Priority Data

Dec. 4, 2007 (KR) .................. 10-2007-0125197

(51) Int. Cl.
*H04N 9/47* (2006.01)
*H04N 13/04* (2006.01)
*G02B 27/22* (2006.01)

(52) U.S. Cl.
CPC .................. *G02B 27/2214* (2013.01)

(58) Field of Classification Search
CPC ........................... G02B 27/22; G02B 27/2214
USPC ................................. 348/54, 51, 55
See application file for complete search history.

(56) References Cited

U.S. PATENT DOCUMENTS 6,791,570 B1  9/2004  Schwerdtner et al.
8,029,141 B2 * 10/2011 Mizushima et al. ............. 353/20
2003/0052836 A1  3/2003 Matsumoto et al.
2005/0225502 A1 10/2005 Nam et al.
2007/0058113 A1 *  3/2007 Wu et al. ........................ 349/106
2008/0043092 A1 *  2/2008 Evans et al. ..................... 348/36

FOREIGN PATENT DOCUMENTS

| CN | 10-1049028 A | 10/2007 |
|---|---|---|
| GB | 2 415 850 A | 1/2006 |
| GB | 2 422 737 A | 8/2006 |
| WO | WO 98/27451 A1 | 6/1998 |
| WO | WO 2006/033447 A2 | 3/2006 |
| WO | WO 2007/083983 A1 | 7/2007 |

OTHER PUBLICATIONS

Hui Nam et al., "7.3: Auto-Steroscopic Swing 3D Display," *SID 05 Digest*, 2005, pp. 94-97.

* cited by examiner

*Primary Examiner* — Daniel C Murray
*Assistant Examiner* — Adam Cooney
(74) *Attorney, Agent, or Firm* — Morgan, Lewis & Bockius LLP (57) ABSTRACT

A three-dimensional image display device includes: a display panel including a plurality of pixels each having red, green and blue sub-pixels, the red, green and blue sub-pixels alternately disposed along a horizontal direction and each of the red, green and blue sub-pixels disposed in a single line along a vertical direction; and a parallax barrier over the display panel, the parallax barrier including a plurality of open areas and a blocking area surrounding the plurality of open areas, the plurality of open areas alternating with the blocking area, and each of the plurality of open areas corresponding to each couple of the adjacent two sub-pixels.

15 Claims, 10 Drawing Sheets

THREE-DIMENSIONAL IMAGE DISPLAY DEVICE AND METHOD OF DRIVING THE SAME

This application claims the benefit of Korean Patent Application No. 10-2007-0125197, filed in Korea on Dec. 4, 2007, which is hereby incorporated by reference in its entirety.

BACKGROUND OF THE INVENTION

1. Field of the Invention

The present application relates to a display device, and more particularly, to a three-dimensional image display device having a pivot function without deterioration in color display and a method of driving the three-dimensional image display device.

2. Discussion of the Related Art

Recently, according to a user's request for a display device displaying a three-dimensional image having an actual feeling, three-dimensional display devices have been researched and developed. In general, a stereoscopic image expressing a three-dimension is displayed using a principle of stereovision through eyes. Accordingly, liquid crystal display (LCD) devices that display an image of a stereoscopic effect using a binocular disparity due to a separation distance of eyes, e.g., about 65 mm have been suggested. When distinct two-dimensional images of a three-dimensional image display device are viewed to right and left eyes, respectively, the distinct two-dimensional images are transmitted to a brain and are combined to a three-dimensional image having depth effect and reality by the brain. This phenomenon may be referred to as a stereography.

There are various types of three-dimensional image display devices, for example, a stereographic type using specific glasses, a stereoscopic type without using and a holographic type. The stereoscopic type three-dimensional image display devices using specific glasses may include a polarization glasses type using an oscillation direction or a rotation direction of a polarized light, a time division glasses type where right-eye and left-eye images are alternately viewed and a density difference type where images having different brightness are viewed to right and left eyes, respectively. In addition, the stereoscopic type three-dimensional image display devices without using glasses may include a parallax barrier type where distinct two-dimensional images are divided by an aperture of a vertical lattice shape and are viewed to right and left eyes, respectively, a lenticular type using a lenticular plate where cylindrical lenses are arranged in stripe, and an integral photography type using a lens plate having a fly eye shape. Furthermore, the holographic type three-dimensional image display device where perfect three-dimensional images having a focus adjustment, a binocular parallax and a movement parallax for stereoscopy are obtained may include a laser light regenerated hologram type and a white light regenerated hologram type.

Figure 1:
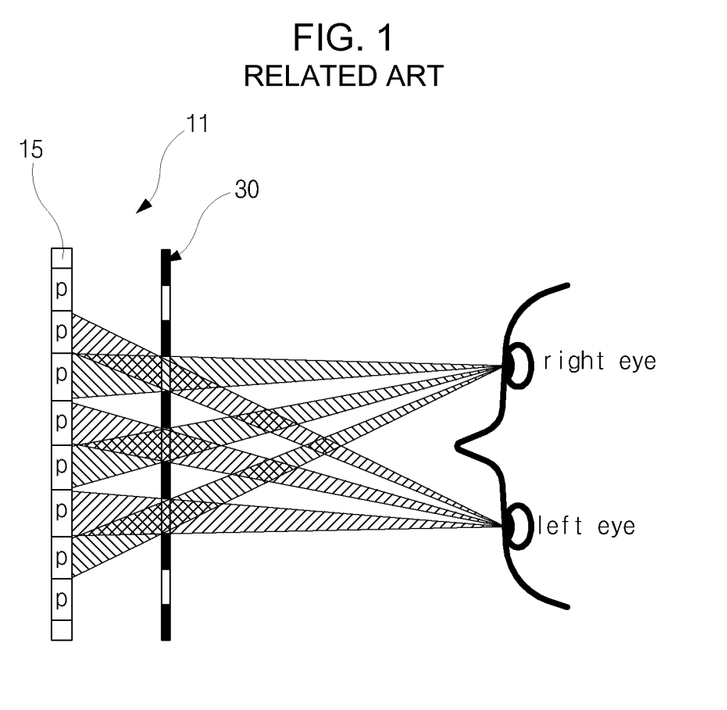
FIG. 1 is a view showing a three-dimensional image display device according to the related art.

Among the various types of three-dimensional image display device, a parallax barrier type three-dimensional image display device has been widely used. FIG. 1 is a view showing a three-dimensional image display device according to the related art. In FIG. 1, a three-dimensional image display device 11 of a parallax barrier type includes a display panel 11 and a parallax barrier 30 over the display panel 11. The display panel 11 displays right-eye and left-eye images, and the parallax barrier 30 has slits arranged horizontally or vertically. The parallax barrier 30 blocks the right-eye image for left eye and the left-eye image for right eye so that the right-eye and left-eye images can be transmitted to the right and left eyes, respectively. As a result, a three-dimensional image resulting from the combination of the right-eye and left-eye images using the binocular parallax is displayed to a user.

Recently, a three-dimensional image display device including a parallax barrier of a mosaic shape has been suggested. In addition, the three-dimensional image display device may have a pivot function such that three-dimensional images are displayed in a landscape mode or a portrait mode. Accordingly, the three-dimensional image display device may display the three-dimensional images when a longer axis of the display panel is arranged along horizontal and vertical directions.

Figure 2:
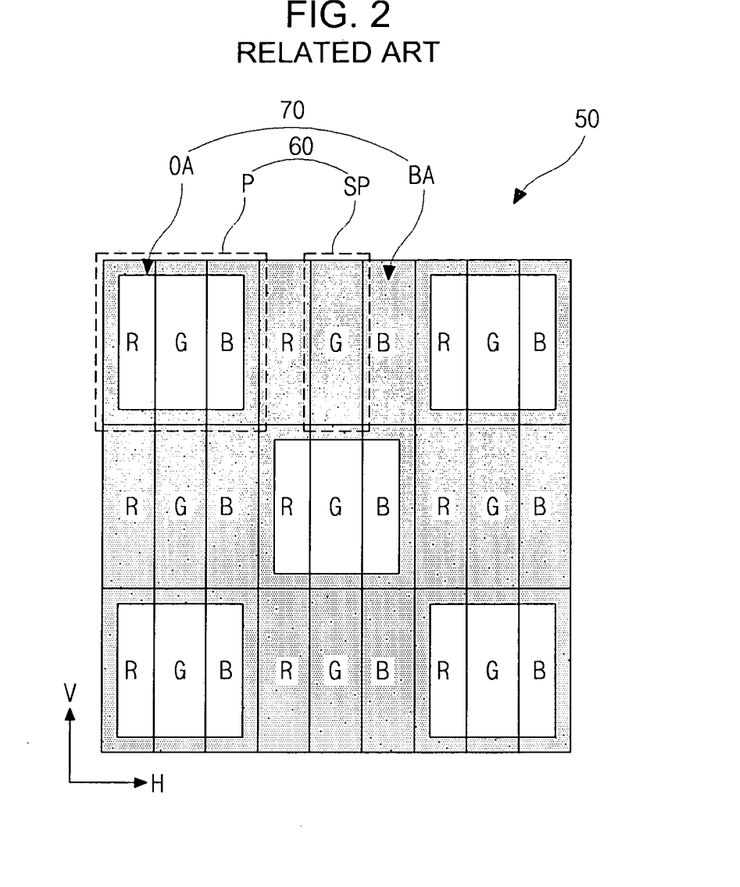
FIG. 2 is a plan view showing a three-dimensional image display device according to the related art.

FIG. 2 is a plan view showing a three-dimensional image display device according to the related art. FIG. 2 corresponds to one of a right-eye image viewed to a right-eye and a left-eye image viewed to a left-eye. In FIG. 2, a three-dimensional image display device 50 of a parallax barrier type includes a display panel 60 and a parallax barrier 70 over the display panel 60. The display panel 60 includes a plurality of pixels P each having red (R), green (G) and blue (B) sub-pixels SP. The red, green and blue colors are arranged in a vertical stripe type such that red, green and blue colors are alternately disposed along a horizontal direction H and each of red, green and blue colors is disposed in a single line along a vertical direction V. The adjacent red, green and blue sub-pixels SP of the single pixel P have one of the right-eye and left-eye images. The parallax barrier 70 has a plurality of open areas OA surrounded by a blocking area BA. The plurality of open areas OA are arranged in a mosaic shape such that the open area OA and the blocking area BA are alternately disposed with each other as in a chess board. Each pixel P corresponds to the single open area OA, and the up, down, right and left pixels P adjacent to the pixel P corresponding to the single open area OA correspond to the blocking area BA. In addition, the up, down, right and left pixels P adjacent to the single pixel P corresponding to the blocking area BA correspond to the plurality of open areas OA.

A user may watch the three-dimensional image display device at a front position or at a slanting position. Alternatively, the three-dimensional image display device may display images in a landscape mode or a portrait mode. When the open area OA of the parallax barrier 70 has the same area as the pixel P of the display panel 60, both the right-eye and left-eye images are transmitted to one of the right and left eyes of a user at the slanting position, thereby a display quality deteriorated. Accordingly, an area of the open area OA is substantially smaller than an area of the pixel P including the red, green and blue sub-pixels SP so that the right-eye and left-eye images can be transmitted to the right and left eyes, respectively. As a result, the deterioration in display quality is prevented.

Figure 3:
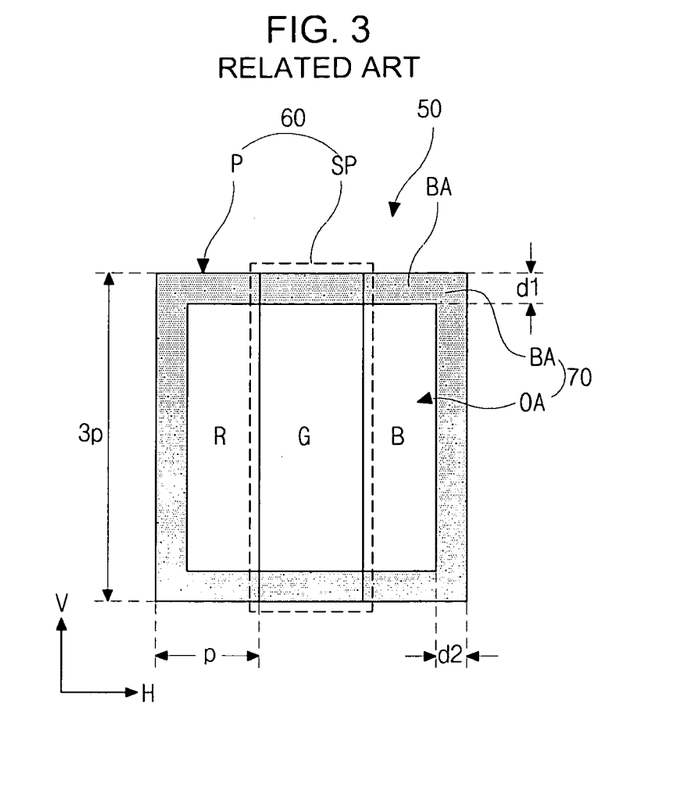
FIG. 3 is a plan view showing an open area and a blocking area of a three-dimensional image display device according to the related art.

FIG. 3 is a plan view showing an open area and a blocking area of a three-dimensional image display device according to the related art. In FIG. 3, a three-dimensional image display device 50 of a parallax barrier type includes a display panel 60 and a parallax barrier 70 over the display panel 60. The display panel 60 includes a pixel P having red (R), green (G) and blue (B) sub-pixels SP. Each sub-pixel SP has a first side parallel to a horizontal direction H and a second side parallel to a vertical direction V. A length 3 p of the second side is about three times of a length p of the first side. The parallax barrier 70 includes an open area OA at a center portion of the pixel P and a blocking area BA surrounding the open area OA. Accordingly, the blocking area BA has a rectangular ring shape including first to fourth side rings. Each of the first and third side rings of the blocking area BA parallel to the horizontal direction H has a first width d1 and each of the second and fourth side rings of the blocking area BA parallel to the vertical direction V has a second width d2. The first and second widths d1 and d2 may be about 5% to about 10% of the length 3 p of the second side of each sub-pixel SP (d1, d2=0.05*(3 p)~0.1*(3 p)=0.15 p~0.3 p). As a result, an area ratio of the open area OA (from (3 p−2*(0.3 p))²=(2.4 p)²=5.76 p² to (3 p−2*(0.15 p))²=(2.7 p)²=7.29 p²) to the pixel P (9 p²), i.e., an aperture ratio is within a range of about 64% to about 81%.

In the three-dimensional image display device according to the related art, since the spatial distribution of colors is different in the red, green and blue sub-pixels SP, a valid viewing zone where a three-dimensional image is viewable is restricted. For example, when the three-dimensional image display device operates in a landscape mode where the red, green and blue sub-pixels SP are alternately disposed along the horizontal direction H, the color distribution may be changed by horizontal movement of a user and the resultant color property of the three-dimensional image may be deteriorated.

Figure 4A:
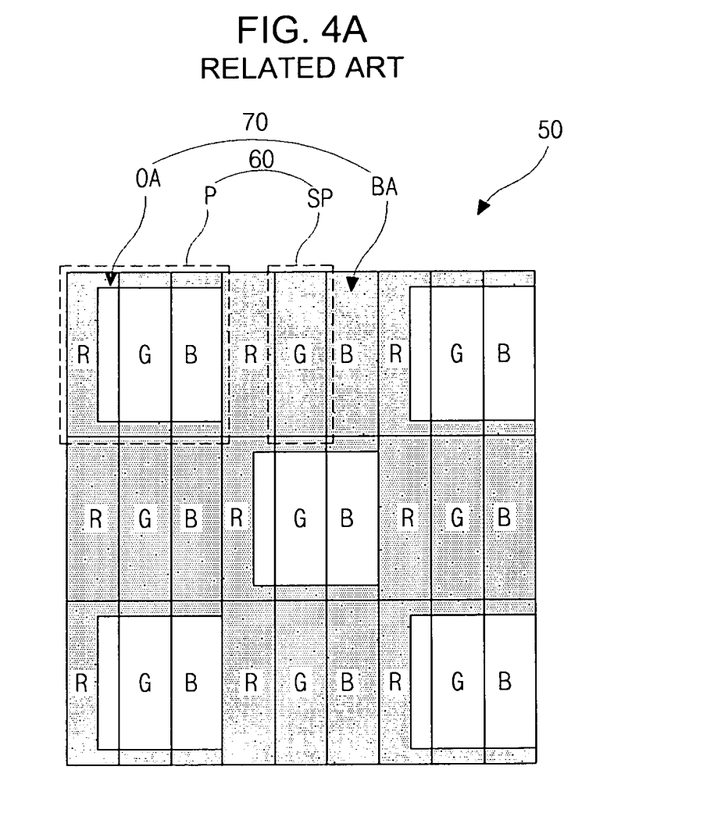
FIGS. 4A and 4B are plan views showing a three-dimensional image display device according to the related art.
Figure 4B:
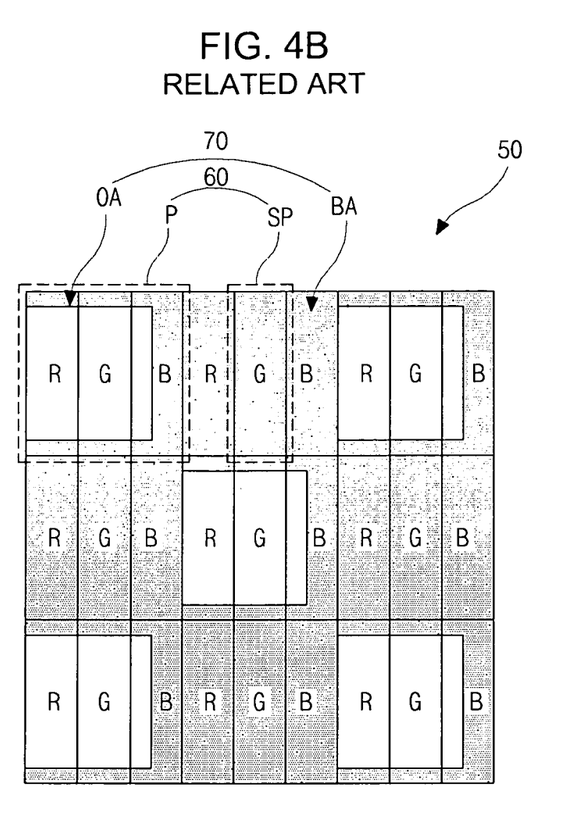

FIGS. 4A and 4B are plan views showing a three-dimensional image display device according to the related art. FIGS. 4A and 4B correspond to one of a right-eye image viewed to a right eye and a left-eye image viewed to a left eye when a user moves left and right, respectively.

In FIG. 4A, when a three-dimensional image display device 50 is viewed to a user having moved left, a parallax barrier 70 may be viewed to be shifted right with respect to a display panel 60. A portion of a blue sub-pixel SP exposed through an open area OA of the parallax barrier 70 is enlarged and a portion of a red sub-pixel SP exposed through the open area OA of the parallax barrier 70 is reduced, while a portion of a green sub-pixel SP is kept constant without change. As a result, the three-dimensional image may have a bluish color. In FIG. 4B, when the three-dimensional image display device 50 is viewed to a user having moved right, the parallax barrier 70 may be viewed to be shifted left with respect to the display panel 60. A portion of the blue sub-pixel SP exposed through the open area OA of the parallax barrier 70 is reduced and a portion of the red sub-pixel SP exposed through the open area OA of the parallax barrier 70 is enlarged, while a portion of the green sub-pixel SP is kept constant without change. As a result, the three-dimensional image may have a reddish color. Accordingly, color display quality of the three-dimensional image is deteriorated and a valid viewing zone is restricted.

SUMMARY OF THE INVENTION

Accordingly, embodiments of the invention are directed to a three-dimensional image display device and a method of driving the displaying three-dimensional image display device that substantially obviate one or more of problems due to limitations and disadvantages of the related art.

An advantage of the invention is to provide a three-dimensional image display device where color display quality and valid viewing zone are improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, a three-dimensional image display device includes: a display panel including a plurality of pixels each having red, green and blue sub-pixels, the red, green and blue sub-pixels alternately disposed along a horizontal direction and each of the red, green and blue sub-pixels disposed in a single line along a vertical direction; and a parallax barrier over the display panel, the parallax barrier including a plurality of open areas and a blocking area surrounding the plurality of open areas, the plurality of open areas alternating with the blocking area, and each of the plurality of open areas corresponding to each couple of the adjacent two sub-pixels.

In another aspect, a method of driving a three-dimensional image display device includes: providing left-eye and right-eye images, the left-eye image including a plurality of left image pixels each having red, green and blue left image sub-pixels, and the right-eye image including a plurality of right image pixels each having red, green and blue right image sub-pixels; and supplying the left-eye and right-eye images to a display panel including a plurality of pixels each having red, green and blue sub-pixels, the red, green and blue left image sub-pixels of the plurality of left image pixels and the red, green and blue right image sub-pixels of the plurality of right image pixels are repeated in the red, green and blue sub-pixels of each of the plurality of pixels with a repetition period corresponding to twelve sub-pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 5:
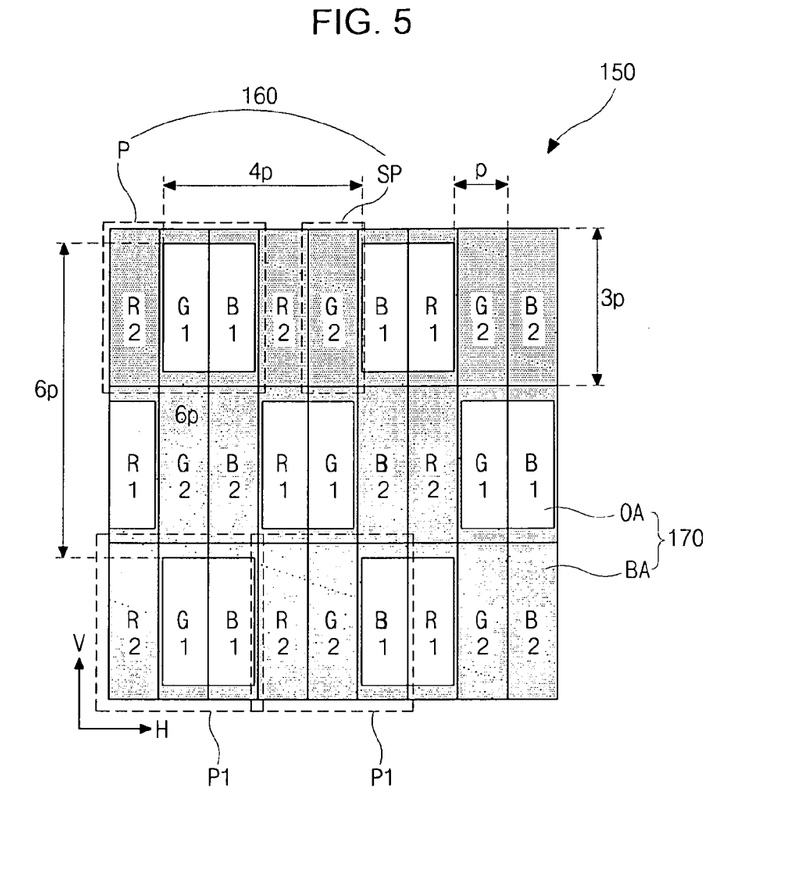
FIG. 5 is a plan view showing a three-dimensional image display device according to an embodiment of the present invention.

FIG. 5 is a plan view showing a three-dimensional image display device according to an embodiment of the present invention. FIG. 5 exemplarily corresponds to a left-eye image viewed to a left eye, and 1 and 2 of FIG. 5 represent the left-eye and right-eye images, respectively.

In FIG. 5, a three-dimensional image display device 150 of a parallax barrier type includes a display panel 160 and a parallax barrier 170 over the display panel 160. The display panel 160 includes a plurality of pixels P each having red (R), green (G) and blue (B) sub-pixels SP. Each of the red (R), green (G) and blue (B) sub-pixels SP has a rectangular shape. The rectangular shape of each sub-pixel SP has a first side parallel to the horizontal direction H and a second side parallel to the vertical direction V. A length 3 p of the second side is about three times of a length p of the first side. The red, green and blue colors are arranged in a vertical stripe type such that red, green and blue colors are alternately disposed along a horizontal direction H and each of red, green and blue colors is disposed in a single line along a vertical direction V.

Although not shown in FIG. 5, the display panel 160 may include a liquid crystal display (LCD) device having a liquid crystal panel and a backlight unit under the liquid crystal panel. The liquid crystal panel includes first and second substrates and a liquid crystal layer between the first and second substrates. A gate line, a data line, a thin film transistor (TFT) and a pixel electrode are formed on an inner surface of the first substrate, and a black matrix, a color filter layer and a common electrode are formed on an inner surface of the second substrate. The gate line and the data line cross each other to define each of the red, green and blue sub-pixels SP. The TFT is connected to the gate line and the data line, and the pixel electrode in each of the red, green and blue sub-pixels SP is connected to the TFT. The black matrix has an open portion corresponding to each sub-pixel SP and may correspond to the gate line, the data line and the TFT. The color filter layer includes red, green and blue color filters corresponding to the red, green and blue sub-pixels SP, respectively. The common electrode is formed on an entire surface of the second substrate having the black matrix and the color filter layer.

Alternatively, the display panel may include an organic electroluminescent display (OELD) device having a gate line, a data line crossing the gate line, a switching TFT connected to the gate line and the data line, a driving TFT connected to the switching TFT and an organic electroluminescent diode connected to the driving TFT. The organic electroluminescent diode may include first and second electrode and an organic emitting layer between the first and second electrodes.

The adjacent red, green and blue sub-pixels SP of the single pixel P have both of the right-eye and left-eye images. For example, in a first pixel P1 at lower left end portion of FIG. 5, the red sub-pixel SP may have a red data of the right-eye image, while the blue and green sub-pixels SP may have green and blue data, respectively of the left-eye image. In addition, in a second pixel P2 at lower middle portion of FIG. 5, the red and green sub-pixels SP may have red and green data, respectively, of the right-eye image, while the blue sub-pixel SP may have a blue data of the left-eye image. Accordingly, left-eye and right-eye images are alternately displayed by the adjacent two sub-pixels SP regardless of the pixel P.

The parallax barrier 170 has a plurality of open areas OA surrounded by a blocking area BA. The plurality of open areas OA are arranged in a mosaic shape such that the plurality of open areas OA alternate with the blocking area BA as in a chess board. A couple of adjacent two sub-pixels SP displaying one of right-eye and left-eye images correspond to each open area OA. Accordingly, up, down, right and left couples of adjacent two sub-pixels SP adjacent to the couple of adjacent two sub-pixels SP corresponding to the open area OA correspond to the blocking area BA. In addition, up, down, right and left couples of adjacent two sub-pixels SP adjacent to the couple of adjacent two sub-pixels SP corresponding to the blocking area BA correspond to the open areas OA. As a result, the plurality of open areas OA of the parallax barrier 170 are disposed with a horizontal repetition pitch of about 4 p and a vertical repetition pitch of about 6 p.

The three-dimensional image display device may be viewed to a user may watch at a front position or at a slanting position. In addition, the three-dimensional image display device may display images in a landscape mode or a portrait mode. To prevent deterioration in display quality due to mixture of the right-eye and left-eye images in one of right and left eyes, an area of the open area OA is substantially smaller than an area of the couple of adjacent two sub-pixels SP of the red, green and blue sub-pixels SP.

Figure 6:
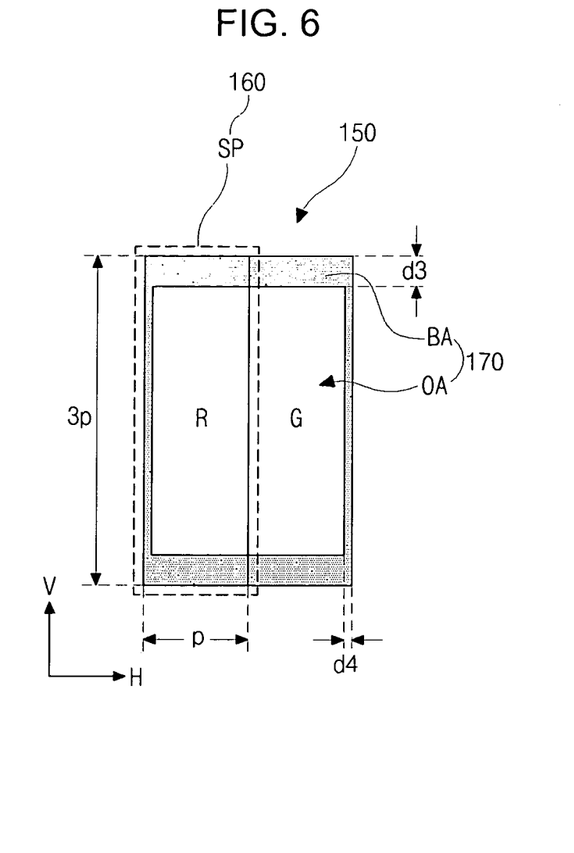
FIG. 6 is a plan view showing an open area and a blocking area of a three-dimensional image display device according to an embodiment of the present invention.

FIG. 6 is a plan view showing an open area and a blocking area of a three-dimensional image display device according to an embodiment of the present invention. In FIG. 6, a three-dimensional image display device 150 of a parallax barrier type includes a display panel 160 and a parallax barrier 170 over the display panel 160. The display panel 160 exemplarily includes a red (R) and green (G) sub-pixels SP as a couple of adjacent two sub-pixels SP. Each sub-pixel SP has a first side parallel to a horizontal direction H and a second side parallel to a vertical direction V. A length 3 p of the second side is about three times of a length p of the first side. The parallax barrier 170 includes an open area OA at a center portion of the couple of adjacent two sub-pixels SP and a blocking area BA surrounding the open area OA. Accordingly, the blocking area BA has a rectangular ring shape including first to fourth side rings. Each of the first and third side rings of the blocking area BA parallel to the horizontal direction H has a third width d3 and each of the second and fourth side rings of the blocking area BA parallel to the vertical direction V has a fourth width d4. The third width d3 is about 5% to about 10% of the length 3 p of the second side of each sub-pixel SP (d3=0.05*(3 p)~0.1*(3 p)=0.15 p~0.3 p), while the fourth width d4 is about 1% to about 3% of the length p of the first side of each sub-pixel SP (d4=0.01 p~0.03 p). Accordingly, each open area OA has a horizontal length of about 97% to about 99% of twice of the first side along the horizontal direction and a vertical length of about 80% to about 90% of the second side along the vertical direction. As a result, an area ratio of the open area OA (from (3 p−2*(0.3 p))*(2 p−2*(0.03 p)=(2.4 p)*(1.94 p)=4.656 p$^2$ to (3 p−2*(0.15 p)*(2 p−2*(0.01 p)= (2.7 p)*(1.98 p)=5.346 p$^2$) to the couple of adjacent two sub-pixels SP (6 p$^2$), i.e., an aperture ratio is within a range of about 77.6% to about 89.1%. Accordingly, the aperture ratio of the three-dimensional image display device is improved.

Figure 7A:
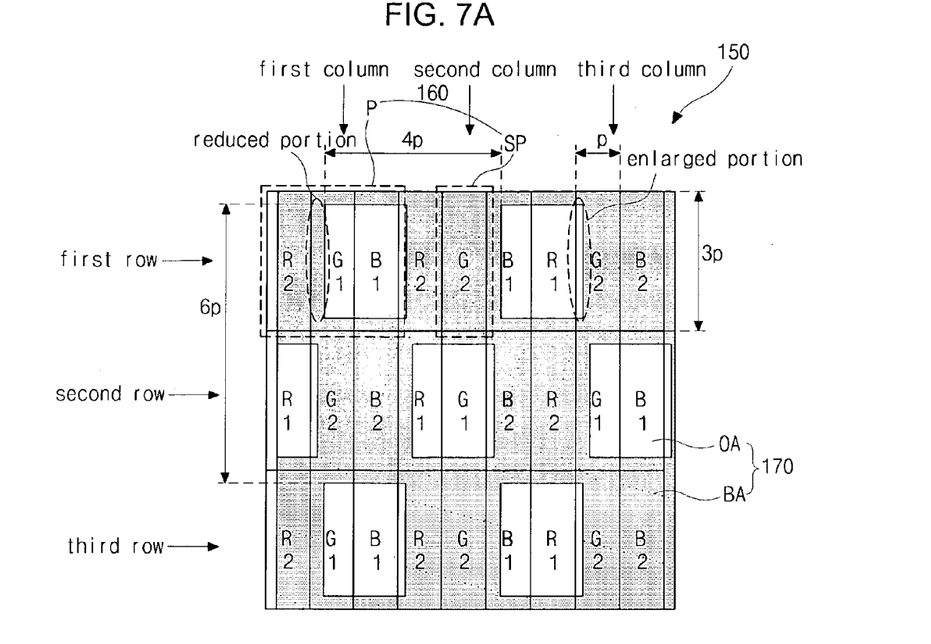
FIGS. 7A and 7B are plan views showing a three-dimensional image display device according to an embodiment of the present invention.
Figure 7B:
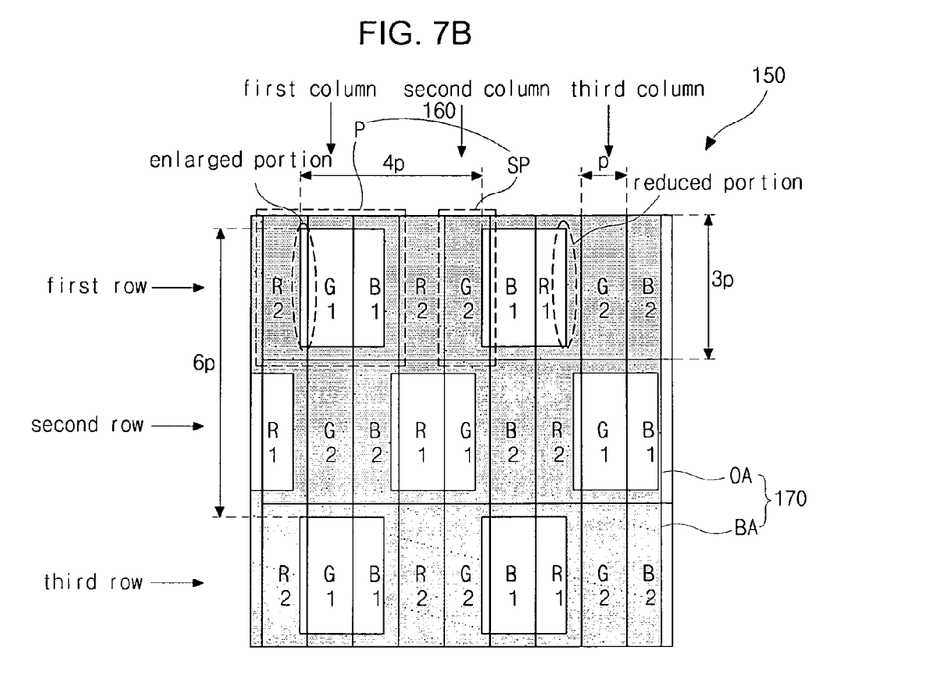

FIGS. 7A and 7B are plan views showing a three-dimensional image display device according to an embodiment of the present invention. FIGS. 7A and 7B exemplarily correspond to left-eye image viewed to a left eye when a user moves left and right, respectively, and 1 and 2 of FIGS. 7A and 7B represent the left-eye and right-eye images, respectively.

In FIGS. 7A and 7B, a three-dimensional image display device 150 includes a display panel 160 and a parallax barrier 170 over the display panel 160. The display panel 160 includes a plurality of pixels P disposed in matrix of three rows by three columns, and each pixel P includes red, green and blue sub-pixels SP. Each sub-pixel SP has a rectangular shape having a first side of a length p and a second side of a length 3 p. The parallax barrier 170 includes a plurality of open areas A and a blocking are BA surrounding the plurality of open areas A. The plurality of open areas OA are disposed with a horizontal repetition pitch of about 4 p and a vertical repetition pitch of about 6 p.

In FIG. 7A, when the three-dimensional image display device 150 is viewed to a user having moved left, the parallax barrier 170 may be viewed to be shifted right with respect to the display panel 160. As a result, although a portion of the green sub-pixel SP exposed through the open area OA corresponding to the pixel P in the first row and the first column is reduced, a portion of the green sub-pixel SP exposed through the open area OA corresponding to the pixel P in the first row and the second column is enlarged. Accordingly, the reduced portion of the green sub-pixel SP in the first row and the first column is compensated by the enlarged portion of the green sub-pixel SP in the first row and the second column, and deterioration in color display quality is prevented.

In FIG. 7B, when the three-dimensional image display device 150 is viewed to a user having moved right, the parallax barrier 170 may be viewed to be shifted left with respect to the display panel 160. As a result, although a portion of the red sub-pixel SP exposed through the open area OA corresponding to the pixel P in the first row and the second column is reduced, a portion of the red sub-pixel SP exposed through the open area OA corresponding to the pixel P in the first row and the first column is enlarged. Accordingly, the reduced portion of the red sub-pixel SP in the first row and the second column is compensated by the enlarged portion of the red sub-pixel SP in the first row and the first column, and deterioration in color display quality is prevented.

In the three-dimensional image display device according to an embodiment of the present invention, therefore, the color distribution by the red, green and blue sub-pixels is kept constant even when a user moves left and right and a valid viewing zone where a three-dimensional image is viewable is improved.

Figure 8:
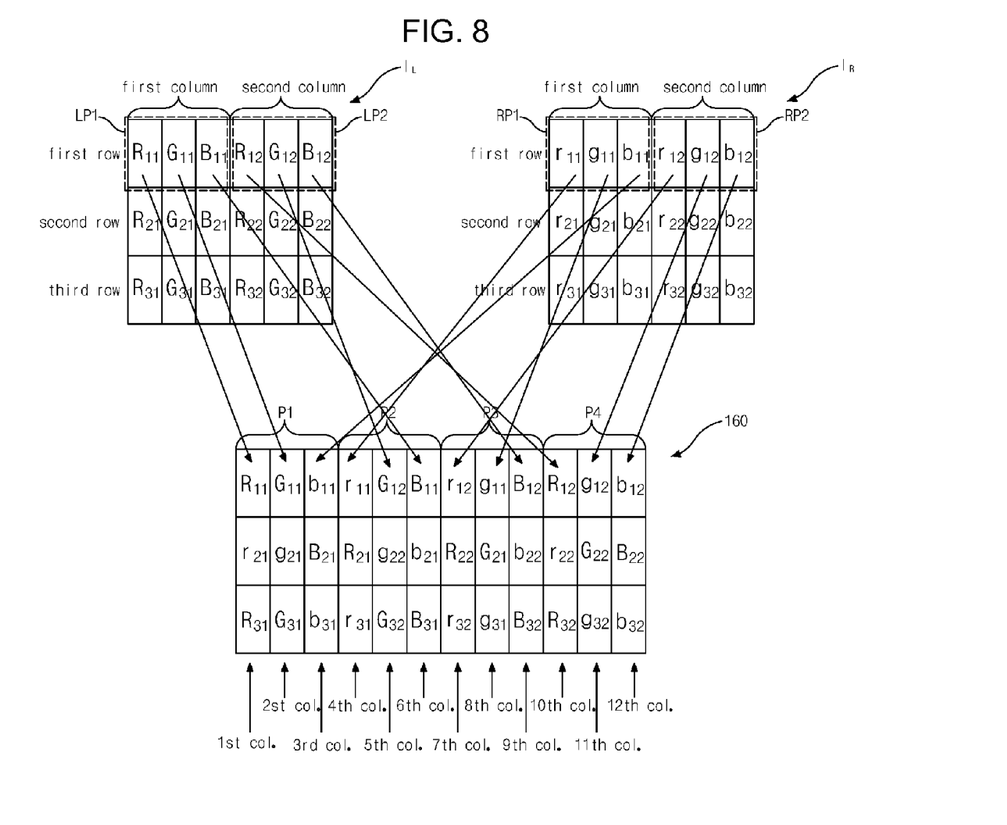
FIG. 8 is a plan view a display device and image data for a three-dimensional image display device according to an embodiment of the present invention.

FIG. 8 is a plan view a display device and image data for a three-dimensional image display device according to an embodiment of the present invention.

In FIG. 8, a left-eye image $I_L$ and a right-eye image $I_R$ are supplied to a display panel 160 of a three-dimensional image display device. The left-eye image $I_L$ includes a plurality of left image pixels, and the right-eye image $I_R$ includes a plurality of right image pixels. Each of the plurality of left image pixels includes red, green and blue left image sub-pixels and each of the plurality of right image pixels includes red, green and blue right image sub-pixels. The plurality of left image sub-pixels may be arranged in a 3 by 2 matrix having three rows and two columns, and the plurality of right image sub-pixels are arranged in a 3 by 2 matrix having three rows and two columns. For example, a first left image pixel LP1 may include a first-first red left image sub-pixel R11, a first-first green left image sub-pixel G11 and a first-first blue left image sub-pixel B11, and a second left image pixel LP2 may include a first-second red left image sub-pixel R12, a first-second green left image sub-pixel G12 and a first-second blue left image sub-pixel B12. The first-first red left image sub-pixel R11, the first-first green left image sub-pixel G11, the first-first blue left image sub-pixel B11, the first-second red left image sub-pixel R12, the first-second green left image sub-pixel G12 and the first-second blue left image sub-pixel B12 may be sequentially arranged in the first row of the left-eye image $I_L$. Similarly, a first right image pixel RP1 may include a first-first red right image sub-pixel r11, a first-first green right image sub-pixel g11 and first-first blue right image sub-pixel b11, and a second right image pixel RP2 may include a first-second red right image sub-pixel r12, a first-second green right image sub-pixel g12 and a first-second blue right image sub-pixel b12. The first-first red right image sub-pixel r11, the first-first green right image sub-pixel $g_{11}$, the first-first blue right image sub-pixel b11, the first-second red right image sub-pixel r12, the first-second green right image sub-pixel g12 and the first-second blue right image sub-pixel $b_{12}$ may be sequentially arranged in the first row of the right-eye image $I_R$.

The display panel 160 includes a plurality of pixels each having red, green and blue sub-pixels. To supplying one of the left image sub-pixel and the right image sub-pixel to each sub-pixel of the display panel 160, the plurality of sub-pixels may be arranged in a 3 by 12 matrix having three rows and twelve columns. For example, the first-first red left image sub-pixel R11, the first-first green left image sub-pixel G11, the first-first blue right image sub-pixel b11, the first-first red right image sub-pixel r11, the first-second green left image sub-pixel G12, the first-first blue left image sub-pixel B11, the first-second red right image sub-pixel r12, the first-first green right image sub-pixel g11, the first-second blue left image sub-pixel B12, the first-second red left image sub-pixel R12, the first-second green left image sub-pixel g12 and the first-second blue right image sub-pixel b12 may be sequentially supplied to the sub-pixels in the first row of the display panel 160.

The first-first red left image sub-pixel R11, the first-first green left image sub-pixel G11 and the first-first blue right image sub-pixel b11 constitute a first pixel P1, the first-first red right image sub-pixel r11, the first-second green left image sub-pixel G12 and the first-first blue left image sub-pixel B11 constitute a second pixel P2. Similarly, the first-second red right image sub-pixel r12, the first-first green right image sub-pixel g11 and the first-second blue left image sub-pixel B12 constitute a third pixel P3, and the first-second red left image sub-pixel R12, the first-second green left image sub-pixel g12 and the first-second blue right image sub-pixel b12 constitute a fourth pixel P4. As a result, the left image sub-pixels of the first and second columns in the first row of the left-eye image $I_L$ and the right image sub-pixels of the first and second columns in the first row of the right-eye image $I_R$ are distributed to the sub-pixels of the first to fourth columns in the first row of the display panel 160. For example, the arrangement of the left image sub-pixels and the right image sub-pixels may be repeated in the sub-pixels of the display panel 160 with a repetition period of twelve sub-pixels.

The second-first red right image sub-pixel r21 and the second-first green right image sub-pixel g21 are supplied to the sub-pixels of the first and second columns, respectively, in the second row of the display panel 160, while the third-first red left image sub-pixel R31 and the third-first green left image sub-pixel G31 are supplied to the sub-pixels of the first and second columns, respectively, in the third row of the display panel 160. Accordingly, the left-eye image $I_L$ and the right-eye image $I_R$ are alternately supplied to the sub-pixels of the same column of the display panel 160. For example, the left-eye and right-eye images $I_L$ and $I_R$ may be alternately supplied to the sub-pixels of the display panel 160 along the vertical direction V.

Although the pixel of the display panel 160 is constituted by the left image sub-pixels of the left-eye image $I_R$ and the right image sub-pixels of the right-eye image $I_L$, the left image sub-pixels and the right-image sub-pixels may be exclusively viewed to the left eye and the right eye, respectively, by the parallax barrier 170 (of FIG. 5). In addition, the left-eye image $I_L$ constituted by the left image sub-pixels and the right-eye image $I_R$ constituted by the right image sub-pixels are combined to constitute a three-dimensional image. Accordingly, a user recognizes the three-dimensional image having improved brightness and valid viewing zone without deterioration in color display quality.

Although each of the left-eye image and the right-eye image includes six columns in FIG. 8, each of the left-eye image and the right-eye image may include twelve columns in another embodiment. In addition, one of adjacent two columns in each of the left-eye image and the right-eye image may be selectively supplied to the display panel for displaying.

Consequently, in a three-dimensional image display device of a parallax barrier type according to the present invention, left-eye and right-eye images are alternately supplied to a plurality of couples of adjacent two sub-pixels of a display panel, and a plurality of open areas of a parallax barrier corresponding to the couple of adjacent two sub-pixels are periodically disposed with a horizontal repetition pitch of four sub-pixels. As a result, a ratio of the plurality of open areas to the couple of adjacent two sub-pixels is enlarged and aperture ratio of the three-dimensional image display device is improved. Further, a three-dimensional image is displayed without deterioration in color display quality and a valid viewing zone of the three-dimensional image display device is improved.

It will be apparent to those skilled in the art that various modifications and variations can be made in a three-dimensional image display device and a method of driving the three-dimensional image display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A three-dimensional image display device, comprising:
   a display panel including a plurality of pixels each comprising red, green, and blue sub-pixels, the red, green, and blue sub-pixels alternately disposed along a horizontal direction, each of the red, green, and blue sub-pixels being disposed in a single line along a vertical direction; and
   a parallax barrier in front of the display panel, the parallax barrier including a plurality of open areas and a blocking area surrounding the plurality of open areas, the plurality of open areas alternating with the blocking area, each of the plurality of open areas corresponding to a couple of the adjacent two sub-pixels along the horizontal direction,
   wherein an area ratio of each of the plurality of open areas to the couple of the adjacent two sub-pixels is within a range of 77.6% to 89.1%,
   wherein the display panel displays:
      a left-eye image comprising a plurality of left image pixels, each comprising red, green, and blue left image sub-pixels, and
      a right-eye image comprising a plurality of right image pixels, each comprising red, green, and blue right image sub-pixels,
   wherein the plurality of left image pixels and the plurality of right image pixels are exclusively viewed to a left eye and a right eye, respectively, by the parallax barrier, and
   wherein the red, green, and blue left image sub-pixels of the plurality of left image pixels and the red, green, and blue right image sub-pixels of the plurality of right image pixels are repeated in the red, green, and blue sub-pixels of each of the plurality of pixels with a repetition period corresponding to twelve sub-pixels along the horizontal direction.

2. The device according to claim 1, wherein each of the red, green, and blue sub-pixels comprises a rectangular shape comprising first and second sides parallel to the horizontal and vertical directions, respectively.

3. The device according to claim 2, wherein the plurality of open areas are disposed with:
   a horizontal repetition pitch of four times of a length of the first side; and
   a vertical repetition pitch of twice of a length of the second side.

4. The device according to claim 2, wherein an area of each of the plurality of open areas is smaller than an area of each couple of the adjacent two sub-pixels.

5. The device according to claim 4, wherein each of the plurality of open areas has:
   a horizontal length of about 97% to about 99% of twice of a length of the first side; and
   a vertical length of about 80% to about 90% of a length of the second side.

6. The device according to claim 2, wherein the second side is three times of a length of the first side.

7. The device according to claim 1, wherein the display panel includes one of a liquid crystal display device and an organic electroluminescent display device.

8. The device according to claim 1, wherein the three-dimensional image display device comprises a pivot function such that three-dimensional images are displayed in one of a landscape mode and a portrait mode.

9. A method of driving a three-dimensional image display device comprising a display panel including a plurality of pixels each comprising red, green, and blue sub-pixels, the red, green, and blue sub-pixels alternately disposed along a horizontal direction, each of the red, green, and blue sub-pixels being disposed in a single line along a vertical direction, and a parallax barrier in front of the display panel, the parallax barrier including a plurality of open areas and a blocking area surrounding the plurality of open areas, the plurality of open areas alternating with the blocking area, each of the plurality of open areas corresponding to a couple of the adjacent two sub-pixels along the horizontal direction, an area ratio of each of the plurality of open areas to the couple of the adjacent two sub-pixels being within a range of 77.6% to 89.1%, the method comprising:
   providing left-eye and right-eye images, the left-eye image including a plurality of left image pixels each comprising red, green, and blue left image sub-pixels, and the right-eye image including a plurality of right image pixels each comprising red, green, and blue right image sub-pixels; and
   supplying the left-eye and right-eye images to the display panel,
   wherein the red, green, and blue left image sub-pixels of the plurality of left image pixels and the red, green, and blue right image sub-pixels of the plurality of right image pixels are repeated in the red, green, and blue sub-pixels of each of the plurality of pixels with a repetition period corresponding to twelve sub-pixels along the horizontal direction, and
   wherein the plurality of left image pixels and the plurality of right image pixels are exclusively viewed to a left eye and a right eye, respectively, by the parallax barrier.

10. The method according to claim 9, wherein:
   the red, green, and blue left image sub-pixels of the plurality of left image pixels are arranged in a 3 by 2 matrix comprising first to third rows and first and second columns;

the red, green, and blue right image sub-pixels of the plurality of right image pixels are arranged in a 3 by 2 matrix comprising first to third rows and first and second columns;

the plurality of sub-pixels are arranged in a 3 by 12 matrix comprising first to third rows and first to twelfth columns; and the red, green, and blue left image sub-pixels of the first and second columns in the first row and the red, green, and blue right image sub-pixels of the first and second columns in the first row are distributed to the plurality of sub-pixels of the first to fourth columns in the first row.

11. The method according to claim 10, wherein the left-eye image and the right-eye image are alternately supplied to the plurality of sub-pixels of the first to third rows in one of the first to twelfth columns.

12. The device according to claim 1, wherein:
the plurality of left image pixels comprises:
 a first left image pixel comprising:
  a first-first red left image sub-pixel;
  a first-first green left image sub-pixel; and
  a first-first blue left image sub-pixel; and
 a second left image pixel comprising:
  a first-second red left image sub-pixel;
  a first-second green left image sub-pixel; and
  a first-second blue left image sub-pixel;
the plurality of right image pixels comprises:
 a first right image pixel comprising:
  a first-first red right image sub-pixel;
  a first-first green right image sub-pixel; and
  a first-first blue right image sub-pixel; and
 a second right image pixel comprising:
  a first-second red right image sub-pixel;
  a first-second green right image sub-pixel; and
  a first-second blue right image sub-pixel;
the plurality of pixels comprises first to fourth pixels each having red, green, and blue sub-pixels;
the first-first red left image sub-pixel, the first-first green left image sub-pixel, and the first-first blue right image sub-pixel are supplied to the red, green, and blue sub-pixels, respectively, of the first pixel;
the first-first red right image sub-pixel, the first-second green left image sub-pixel, and the first-first blue left image sub-pixel are supplied to the red, green, and blue sub-pixels, respectively, of the second pixel;
the first-second red right image sub-pixel, the first-first green right image sub-pixel, and the first-second blue left image sub-pixel are supplied to the red, green, and blue sub-pixels, respectively, of the third pixel; and
the first-second red left image sub-pixel, the first-second green right image sub-pixel, and the first-second blue right image sub-pixel are supplied to the red, green, and blue sub-pixels, respectively, of the fourth pixel.

13. The method according to claim 9, wherein:
the plurality of left image pixels comprises:
 a first left image pixel comprising:
  a first-first red left image sub-pixel;
  a first-first green left image sub-pixel; and
  a first-first blue left image sub-pixel; and
 a second left image pixel comprising:
  a first-second red left image sub-pixel;
  a first-second green left image sub-pixel; and
  a first-second blue left image sub-pixel;
the plurality of right image pixels comprises:
 a first right image pixel comprising:
  a first-first red right image sub-pixel;
  a first-first green right image sub-pixel; and
  a first-first blue right image sub-pixel; and
 a second right image pixel comprising:
  a first-second red right image sub-pixel;
  a first-second green right image sub-pixel; and
  a first-second blue right image sub-pixel;
the plurality of pixels comprises first to fourth pixels each having red, green, and blue sub-pixels;
the first-first red left image sub-pixel, the first-first green left image sub-pixel, and the first-first blue right image sub-pixel are supplied to the red, green, and blue sub-pixels, respectively, of the first pixel;
the first-first red right image sub-pixel, the first-second green left image sub-pixel, and the first-first blue left image sub-pixel are supplied to the red, green, and blue sub-pixels, respectively, of the second pixel;
the first-second red right image sub-pixel, the first-first green right image sub-pixel, and the first-second blue left image sub-pixel are supplied to the red, green, and blue sub-pixels, respectively, of the third pixel; and
the first-second red left image sub-pixel, the first-second green right image sub-pixel, and the first-second blue right image sub-pixel are supplied to the red, green, and blue sub-pixels, respectively, of the fourth pixel.

14. A three-dimensional image display device, comprising:
a display panel including a plurality of pixels each comprising red, green, and blue sub-pixels, the red, green, and blue sub-pixels alternately disposed along a horizontal direction, each of the red, green, and blue sub-pixels being disposed in a single line along a vertical direction; and
a parallax barrier in front of the display panel, the parallax barrier including a plurality of open areas and a blocking area surrounding the plurality of open areas, the plurality of open areas alternating with the blocking area, each of the plurality of open areas corresponding to a couple of the adjacent two sub-pixels along the horizontal direction,
wherein the display panel displays:
 a left-eye image comprising a plurality of left image pixels, each comprising red, green, and blue left image sub-pixels, and
 a right-eye image comprising a plurality of right image pixels, each comprising red, green, and blue right image sub-pixels,
wherein the plurality of left image pixels and the plurality of right image pixels are exclusively viewed to a left eye and a right eye, respectively, by the parallax barrier, and
wherein:
the plurality of left image pixels comprises:
 a first left image pixel comprising:
  a first-first red left image sub-pixel,
  a first-first green left image sub-pixel, and
  a first-first blue left image sub-pixel, and
 a second left image pixel comprising:
  a first-second red left image sub-pixel,
  a first-second green left image sub-pixel, and
  a first-second blue left image sub-pixel,
the plurality of right image pixels comprises:
 a first right image pixel comprising:
  a first-first red right image sub-pixel,
  a first-first green right image sub-pixel, and
  a first-first blue right image sub-pixel, and
 a second right image pixel comprising:
  a first-second red right image sub-pixel,
  a first-second green right image sub-pixel, and
  a first-second blue right image sub-pixel, the plurality of pixels comprises first to fourth pixels each having red, green, and blue sub-pixels, the first-first red left image sub-pixel, the first-first green left image sub-pixel, and the first-first blue right image sub-pixel are supplied to the red, green, and blue sub-pixels, respectively, of the first pixel, the first-first red right image sub-pixel, the first-second green left image sub-pixel, and the first-first blue left image sub-pixel are supplied to the red, green, and blue sub-pixels, respectively, of the second pixel, the first-second red right image sub-pixel, the first-first green right image sub-pixel and the first-second blue left image sub-pixel are supplied to the red, green, and blue sub-pixels, respectively, of the third pixel, the first-second red left image sub-pixel, the first-second green right image sub-pixel, and the first-second blue right image sub-pixel are supplied to the red, green, and blue sub-pixels, respectively, of the fourth pixel, wherein the red, green, and blue left image sub-pixels of the plurality of left image pixels and the red, green, and blue right image sub-pixels of the plurality of right image pixels are repeated in the red, green, and blue sub-pixels of each of the plurality of pixels with a repetition period corresponding to twelve sub-pixels along the horizontal direction, and wherein an area ratio of each of the plurality of open areas to the couple of the adjacent two sub-pixels is within a range of 77.6% to 89.1%.

15. A method of driving a three-dimensional image display device comprising a display panel including a plurality of pixels each comprising red, green, and blue sub-pixels, the red, green, and blue sub-pixels alternately disposed along a horizontal direction, each of the red, green, and blue sub-pixels being disposed in a single line along a vertical direction, and a parallax barrier in front of the display panel, the parallax barrier including a plurality of open areas and a blocking area surrounding the plurality of open areas, the plurality of open areas alternating with the blocking area, each of the plurality of open areas corresponding to a couple of the adjacent two sub-pixels along the horizontal direction, an area ratio of each of the plurality of open areas to the couple of the adjacent two sub-pixels being within a range of 77.6% to 89.1%, the method comprising:

providing left-eye and right-eye images, the left-eye image including a plurality of left image pixels each comprising red, green, and blue left image sub-pixels, and the right-eye image including a plurality of right image pixels each comprising red, green, and blue right image sub-pixels; and supplying the left-eye and right-eye images to the display panel, wherein the red, green, and blue left image sub-pixels of the plurality of left image pixels and the red, green, and blue right image sub-pixels of the plurality of right image pixels are repeated in the red, green, and blue sub-pixels of each of the plurality of pixels with a repetition period corresponding to twelve sub-pixels along the horizontal direction, wherein the plurality of left image pixels and the plurality of right image pixels are exclusively viewed to a left eye and a right eye, respectively, by the parallax barrier, and wherein:

the plurality of left image pixels comprises:
a first left image pixel comprising:
a first-first red left image sub-pixel,
a first-first green left image sub-pixel, and
a first-first blue left image sub-pixel, and
a second left image pixel comprising:
a first-second red left image sub-pixel,
a first-second green left image sub-pixel, and
a first-second blue left image sub-pixel, the plurality of right image pixels comprises:
a first right image pixel comprising:
a first-first red right image sub-pixel,
a first-first green right image sub-pixel, and
a first-first blue right image sub-pixel, and
a second right image pixel comprising:
a first-second red right image sub-pixel,
a first-second green right image sub-pixel, and
a first-second blue right image sub-pixel, the plurality of pixels comprises first to fourth pixels each having red, green, and blue sub-pixels, the first-first red left image sub-pixel, the first-first green left image sub-pixel, and the first-first blue right image sub-pixel are supplied to the red, green, and blue sub-pixels, respectively, of the first pixel, the first-first red right image sub-pixel, the first-second green left image sub-pixel, and the first-first blue left image sub-pixel are supplied to the red, green, and blue sub-pixels, respectively, of the second pixel, the first-second red right image sub-pixel, the first-first green right image sub-pixel, and the first-second blue left image sub-pixel are supplied to the red, green, and blue sub-pixels, respectively, of the third pixel, and the first-second red left image sub-pixel, the first-second green right image sub-pixel, and the first-second blue right image sub-pixel are supplied to the red, green, and blue sub-pixels, respectively, of the fourth pixel.

* * * * *